Patented Aug. 22, 1933

1,923,707

UNITED STATES PATENT OFFICE 1,923,707

ANTIOXIDANT

Albert M. Clifford, Stow, Ohio, assignor to The Goodyear Tire & Rubber Company, Akron, Ohio, a Corporation of Ohio No Drawing. Application September 14, 1932
Serial No. 633,213

20 Claims. (Cl. 18—50)

This invention relates to a new class of age-resisting compounds suitable for incorporation as antioxidants in rubber, gutta percha, balata and other deteriorable compositions. The substances comprising the class in question have been found by numerous tests to protect rubber against deterioration from such influences as heat, light and oxygen. In addition they impart other desirable properties, such as improved tensile strength, to the vulcanized product.

This application is in part a continuation of application Serial No. 347,183, filed March 14, 1929.

Substances which may be employed as antioxidants in accordance with the teachings of the invention are tertiary N-dicyclic naphthylamines of the following type formula:

R being a naphthyl group, substituted or unsubstituted; $R_1$ and $R_2$, cyclic groups. Particularly illustrative of the cyclic groups are alicyclic radicals such as cyclo hexyl and aryl radicals such as phenyl, tolyl, xylyl and naphthyl. It is to be understood that as hereinafter used the term "benzenoid" embraces phenyl and naphthyl groups which, as preferred, do or do not contain substituents such as alkyl, alkoxy, hydroxy, amino and like groups.

Falling within the scope of the invention are tri beta naphthylamine, tri alpha naphthylamine, N-diphenyl (alpha or beta) naphthylamine, N-phenyl di (alpha or beta) naphthylamine, N-phenyl alpha beta dinaphthylamine, N-di tolyl (alpha or beta) naphthylamine, N-phenyl tolyl beta naphthylamine, N-para ethoxy phenyl tolyl beta naphthylamine, N-phenyl xylyl alpha naphthylamine, N-di-xylyl naphthylamines, N-tolyl xylyl beta naphthylamine, N-di ortho hydroxy phenyl naphthylamine, N-tolyl di (alpha or beta) naphthylamine, N-xylyl di (alpha or beta) naphthylamine, N-dicyclo hexyl naphthylamine, N-cyclo hexyl dinaphthylamine, N-cyclohexyl phenyl beta naphthylamine, N-cyclohexyl phenyl alpha naphthylamine, N-diphenyl tetra hydro naphthylamine, N-4-amino 2-methyl phenyl tolyl naphthylamine, N-di-tolyl tetra hydro naphthylamine, N-phenyl tolyl tetra hydro naphthylamine, N-cyclohexyl tolyl tetra hydro naphthylamine, N-tolyl di tetra hydro naphthylamine, N-tri tetra hydro naphthylamine, N-dipara methoxy phenyl alpha naphthylamine, N-di-xylyl tetra hydro naphthylamine and N-para amino phenyl phenyl beta naphthylamine.

The antioxidants of the present invention, in general, may be prepared by simple chemical processes; for instance, N-diphenyl naphthylamine may be prepared by reacting in an autoclave 507 grams of diphenyl amine with 216 grams of beta naphthol in the presence of about 7.2 grams of tin tetra-chloride at a temperature of approximately 340 degrees C. for 8 hours. A dark brown oil is first obtained, from which, by pouring into 1½ liters of water containing 65 grams of sodium hydroxide, about 43 grams of beta naphthol are recovered. The residue, a soft buttery solid, gives, when distilled at 150-175 degrees C. and 8 mm. pressure, a fraction of 385 grams consisting essentially of diphenyl amine and, at 175-275 degrees C. at 8 mm. pressure, a fraction of 175 grams consisting of two portions, one believed to be N-diphenyl beta naphthylamine and the other, N-diphenyl alpha naphthylamine. The N-diphenyl beta naphthylamine portion contains 4.78% nitrogen as compared with the theoretical nitrogen content of 4.74% and melts at 161.5 degrees C. The N-diphenyl alpha naphthylamine portion melts at 119-119.5 degrees C. and has a nitrogen content of 4.60% as compared with the theoretical of 4.74%. In the subsequent data tests of the mixture of the two compounds are given.

Tri beta naphthylamine may be obtained by heating beta naphthol with anhydrous ammonia in an autoclave at approximately 310 degrees C. for a period of 8-14 hours in accordance with the disclosure of a copending application Serial No. 274,683, filed May 2, 1928. The product, containing a large amount of dibetanaphthylamine in addition to the tri beta naphthylamine, may be separated by extraction with benzol in which the tri beta naphthylamine is readily soluble and from which it crystallizes upon standing in the form of fine white crystals having a melting point of from 233 to 235 degrees C. Solutions of tri beta naphthylamine show a dark blue fluorescence when they are held up to the light. The crystalline material itself fluoresces a brilliant light blue when exposed to ultra violet light. In addition, it is quite soluble in aromatic hydrocarbons but comparatively insoluble in ethyl alcohol.

The antioxidants of the present invention may be employed advantageously in substantially any of the standard rubber formulæ, the following being one in which they have been found to give excellent results:

| | |
|---|---|
| Extracted rubber | 100 parts |
| Zinc oxide | 5 parts |
| Sulfur | 3 parts |
| Stearic acid | 1.5 parts |
| Hexamethylene tetramine | 1 part |
| Antioxidant | 1 part |

Samples prepared in accordance with the foregoing formula were subjected to vulcanization for varying periods of time and then tested to ascertain their physical characteristics. One set from each type of stock was tested immediately for tensile strength and elasticity. A second set was subjected to ageing in a Bierer-Davis bomb for 6 days in oxygen at 50 degrees C. under 150 pounds per square inch pressure. At the conclusion of the 6-day period the samples were removed from the bomb and subjected to physical tests corresponding to those conducted upon the unaged samples.

It is evident from the following tables that rubber compositions containing even small proportions of the antioxidants of this invention resist deterioration remarkably well. Similar compositions not containing the antioxidants, on being subjected to corresponding tests, increase in weight in the neighborhood of 10% and lose almost all their tensile and elongation properties.

| Cure | | Stress in kgs/cm² | | | Percent elong. at break | Percent weight increase |
|---|---|---|---|---|---|---|
| Time in mins. | Pressure lbs. sq. in. | 500 percent elong. | 700 percent elong. | Break | | |

Tri beta naphthylamine
*Original*

| 35 | 40 | 12 | 48 | 109 | 880 | |
| 50 | 40 | 16 | 56 | 135 | 850 | |
| 70 | 40 | 26 | 98 | 170 | 800 | |

*After ageing*

| 35 | 40 | 13 | 41 | 105 | 870 | .21 |
| 50 | 40 | 19 | 65 | 135 | 830 | .52 |
| 70 | 40 | 27 | 104 | 152 | 765 | .68 |

N-diphenyl naphthylamine
*Original*

| 35 | 40 | 13 | 33 | 86 | 875 | |
| 50 | 40 | 15 | 45 | 106 | 845 | |
| 70 | 40 | 19 | 63 | 117 | 800 | |

*After ageing*

| 35 | 40 | 13 | 38 | 72 | 810 | .22 |
| 50 | 40 | 15 | 46 | 81 | 800 | .38 |
| 70 | 40 | 20 | 70 | 96 | 750 | .50 |

From the foregoing it is apparent that the compounds herein disclosed are highly suitable for antioxidants of rubber and other products which undergo deterioration under the influences of heat, light and oxygen. It will be evident that numerous changes may be made in the procedure to be followed and the chemicals employed without departing from the inventive concept. It is intended that the patent shall cover, by suitable expression in the appended claims, whatever features of patentable novelty reside in the invention.

What I claim is:

1. A method of preserving rubber which comprises subjecting a vulcanizable rubber compound to vulcanization in the presence of a tri-naphthylamine.

2. A method of preserving rubber which comprises subjecting a vulcanizable rubber compound to vulcanization in the presence of a tri-beta-naphthylamine.

3. A rubber compound which has been vulcanized in the presence of a tri-naphthylamine.

4. A rubber compound that has been vulcanized in the presence of a material having the following formula: $(C_{10}H_7)_3N$.

5. A rubber product that has been vulcanized in the presence of tri-beta-naphthylamine.

6. A method of preserving rubber which comprises subjecting it to vulcanization in the presence of a naphthylamine having the formula

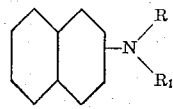

in which R and R₁ are phenyl groups.

7. A method of preserving rubber which comprises subjecting it to vulcanization in the presence of a naphthylamine having the formula

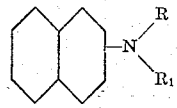

in which R and R₁ are benzenoid groups.

8. A method of preserving rubber which comprises subjecting it to vulcanization in the presence of a naphthylamine having the formula

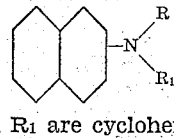

in which R and R₁ are cyclohexyl groups.

9. A method of preserving rubber which comprises subjecting it to vulcanization in the presence of a naphthylamine having the formula

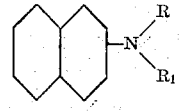

in which R and R₁ are aryl groups.

10. A method of preserving rubber which comprises subjecting it to vulcanization in the presence of a naphthylamine having the formula

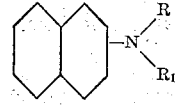

in which R and R₁ are cyclic groups.

11. A method of preserving rubber which comprises subjecting it to vulcanization in the presence of a naphthylamine having the formula

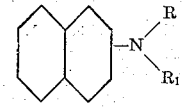

in which R and R₁ are cyclic hydrocarbon groups.

12. A method of preserving rubber which comprises subjecting it to vulcanization in the presence of a tertiary N-dicyclic naphthylamine.

13. A rubber product that has been vulcanized in the presence of a tertiary N-diphenyl naphthylamine.

14. A rubber product that has been vulcanized in the presence of a tertiary N-phenyl aryl naphthylamine.

15. A rubber product that has been vulcanized in the presence of a tertiary N-phenyl benzenoid naphthylamine.

16. A rubber product that has been vulcanized in the presence of a tertiary N-dibenzenoid naphthylamine.

17. A rubber product that has been vulcanized in the presence of a tertiary N-dicyclic naphthylamine.

18. A rubber product that has been vulcanized in the presence of N-diphenyl beta naphthylamine, 19. A rubber product that has been vulcanized in the presence of a tertiary N-dicyclohexyl naphthylamine.

20. A rubber product that has been vulcanized in the presence of N-dicyclohexyl naphthylamine.

ALBERT M. CLIFFORD.